United States Patent
Tan et al.

(10) Patent No.: US 7,349,017 B2
(45) Date of Patent: Mar. 25, 2008

(54) COLOR SENSOR CIRCUIT WITH INTEGRATED PROGRAMMABLE GAIN SELECTION

(75) Inventors: Boon Keat Tan, Penang (MY); Chi Mun Ho, N. Sembilan (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 779 days.

(21) Appl. No.: 10/828,707

(22) Filed: Apr. 21, 2004

(65) Prior Publication Data

US 2005/0237401 A1  Oct. 27, 2005

(51) Int. Cl.
*H04N 3/14* (2006.01)
*H04N 5/335* (2006.01)

(52) U.S. Cl. .................................................. 348/301

(58) Field of Classification Search ............... 348/294, 348/302, 308, 301; 257/291, 292, 208.1
See application file for complete search history.

(56) References Cited

U.S. PATENT DOCUMENTS

| | | | | |
|---|---|---|---|---|
| 3,790,288 A | * | 2/1974 | Hostetter | 250/214 R |
| 3,960,452 A | * | 6/1976 | Huebner | 356/407 |
| 4,919,099 A | | 4/1990 | Extance et al. | |
| 6,552,605 B1 | | 4/2003 | Yoon | |
| 6,658,217 B2 | | 12/2003 | Ohhata et al. | |
| 6,710,915 B2 | | 3/2004 | Itoh | |
| 6,876,384 B1 | * | 4/2005 | Hubina et al. | 348/223.1 |
| 2002/0175752 A1 | * | 11/2002 | Pomata et al. | 330/141 |
| 2005/0219379 A1 | * | 10/2005 | Shi | 348/223.1 |

FOREIGN PATENT DOCUMENTS

JP   62269507 A  * 11/1987

* cited by examiner

*Primary Examiner*—Lin Ye
*Assistant Examiner*—Jason Whipkey

(57) ABSTRACT

A color sensor is implemented on a single integrated circuit chip. The color sensor includes a plurality of color sensor circuits and a gain selection control. Each color sensor circuit in the plurality of color sensor circuits includes a light detector, an amplifier and a gain selection circuit. The amplifier is connected to the light detector. The amplifier amplifies a signal from the light detector. The gain selection circuit is connected to the amplifier. The gain selection controls gain of the amplifier. The gain selection circuit includes a variable feedback resistance. The gain selection control selects a separate value of the variable feedback resistance for each color sensor circuit.

16 Claims, 5 Drawing Sheets

COLOR SENSOR CIRCUIT WITH INTEGRATED PROGRAMMABLE GAIN SELECTION

BACKGROUND

The present invention relates to detection of light and pertains particularly to a color sensor circuit with integrated programmable gain selection.

A typical color sensor circuit detects three colors. The three colors are typically red, blue and green. Three separate components are used to implement each color of a color sensor. A first component includes a photodiode and filter that are used to detect an illuminance for the color. The second component is an operational amplifier that functions as a transimpedance amplifier. The third component is a feedback resistor. Typically, the three components for each color are mounted on a printed circuit board (PCB).

Typically, the photodiodes have a relatively large area which is necessary to generate high photocurrents. The high photocurrents are necessary to make the sensor circuit less susceptible to noise. Correspondingly large values for feedback resistors are also used. The values of external resistors are selected to give the proper gain needed for the transimpedance amplifier.

The required feedback resistance and feedback capacitance vary from system to system, which has made it necessary in the prior art to implement the feedback resistor on a separate component from the photodiodes.

SUMMARY OF THE INVENTION

In accordance with embodiments of the present invention, a color sensor is implemented on a single integrated circuit chip. The color sensor includes a plurality of color sensor circuits and a gain selection control. Each color sensor circuit in the plurality of color sensor circuits includes a light detector, an amplifier and a gain selection circuit. The amplifier is connected to the light detector. The amplifier amplifies a signal from the light detector. The gain selection circuit is connected to the amplifier. The gain selection controls gain of the amplifier. The gain selection circuit includes a variable feedback resistance. The gain selection control selects a separate value of the variable feedback resistance for each color sensor circuit.

DESCRIPTION OF THE EMBODIMENT

Figure 1:
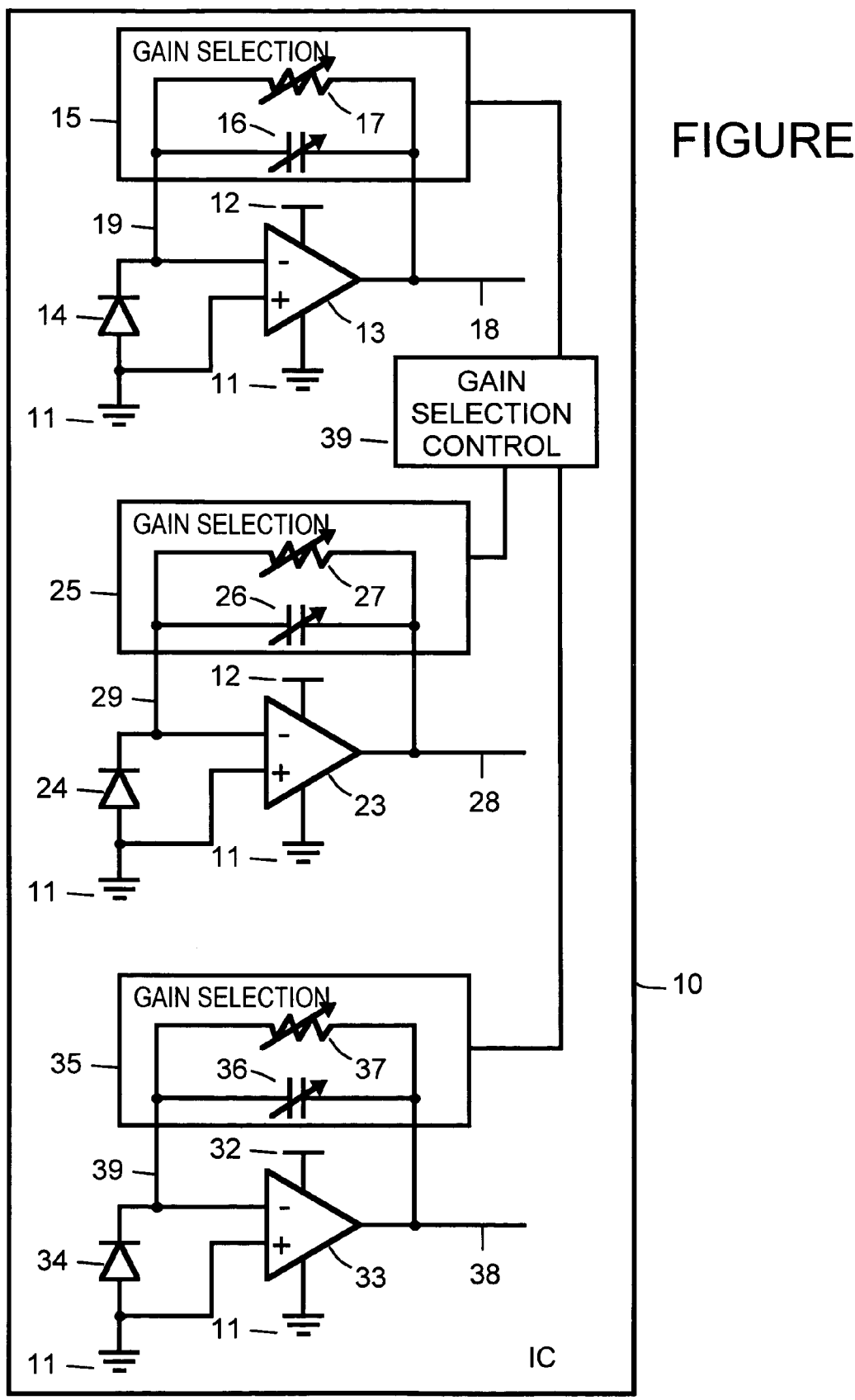
FIG. 1 is a simplified block diagram of a color sensor circuit in accordance with an embodiment of the present invention.

FIG. 1 shows a color sensor circuit implemented on a single integrated circuit (IC) chip 10. A first color circuit generates a first output voltage placed on an output 18. The first output voltage indicates detected illuminance of a first color. For example, the first color is red. A photo diode and filter 14 detect illuminance of the first color. Photo diode and filter 14 is connected between a ground signal 11 and a line 19. An operational amplifier 13 amplifies voltage on line 19 to produce the first output voltage placed on output 18. Gain is controlled by a gain selection circuit 15. Gain selection circuit 15 includes a feedback resistance 17 and a compensation capacitance 16. Operational amplifier 13 is connected to ground signal 11 and a Vcc signal 12, as shown.

A second color circuit generates a second output voltage placed on an output 28. The second output voltage indicates detected illuminance of a second color. For example, the second color is green. A photo diode and filter 24 detect illuminance of the second color. Photo diode and filter 24 is connected between ground signal 11 and a line 29. An operational amplifier 23 amplifies voltage on line 29 to produce the second output voltage placed on output 28. Gain is controlled by a gain selection circuit 25. Gain selection circuit 25 includes a feedback resistance 27 and a compensation capacitance 26. Operational amplifier 23 is connected to ground signal 11 and Vcc signal 12, as shown.

A third color circuit generates a third output voltage placed on an output 38. The third output voltage indicates detected illuminance of a third color. For example, the third color is blue. A photo diode and filter 34 detect illuminance of the third color. Photo diode and filter 34 is connected between ground signal 11 and a line 39. An operational amplifier 33 amplifies voltage on line 39 to produce the third output voltage placed on output 38. Gain is controlled by a gain selection circuit 35. Gain selection circuit 35 includes a feedback resistance 37 and a compensation capacitance 36. Operational amplifier 33 is connected to ground signal 11 and Vcc signal 12, as shown.

A gain selection control circuit 39 controls selected values for feedback resistance 17, compensation capacitance 16, feedback resistance 27, compensation capacitance 26, feedback resistance 37 and compensation capacitance 36. For example, gain selection for each color is selected independent of gain selection for the other colors. This allows individual selection of resistance to achieve an optimum voltage swing for the output voltage for each color. Resolution (accuracy) of the output voltage for each color is based on the number of bits used for gain selection. The more bits used, the greater resolution that can be achieved.

Figure 2:
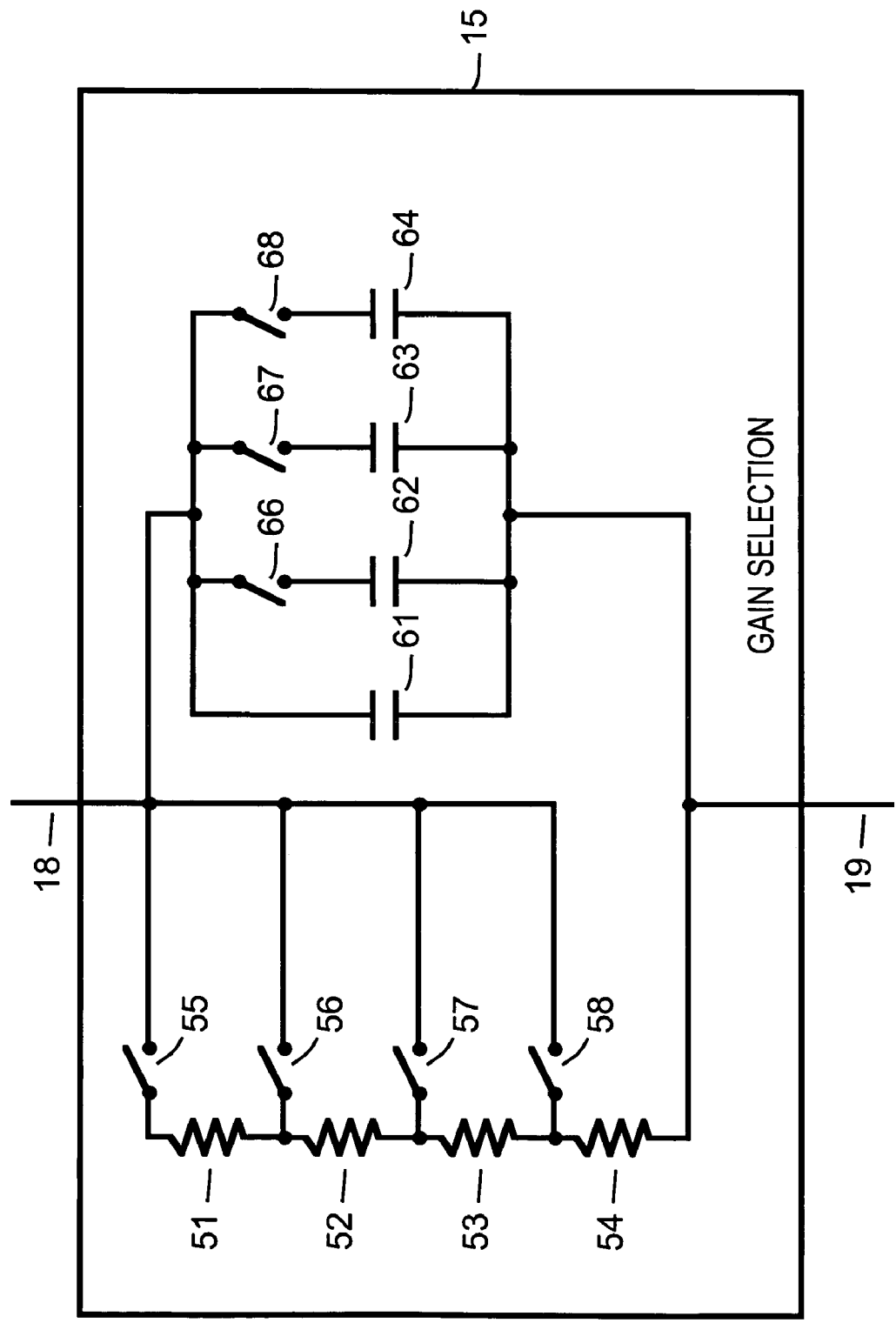
FIG. 2 is a simplified block diagram of a gain selection circuit in accordance with an embodiment of the present invention.

FIG. 2 is an example implementation of gain selection circuit 15. Feedback resistance 17 (shown in FIG. 1) is implemented by a resistor 51, a resistor 52, a resistor 53, a resistor 54, a switch 55, a switch 56, a switch 57 and a switch 58 connected as shown. Compensation capacitance 16 (shown in FIG. 1) is implemented by a capacitor 61, a capacitor 62, a capacitor 63, a capacitor 64, a switch 66, a switch 67 and a switch 68 connected as shown.

For the example implementation of gain selection circuit 15, gain can be controlled by two bits. The two bits allow for selection of four different values for feedback resistance 17 and four different values for compensation capacitance 16. Different values for feedback resistance 17 are selected using switches (SW) 55 through 58. For example, the four different values for resistance are labeled $R_0$ (resistor 51+resistor 52+resistor 53+resistor 54), $R_1$ (resistor 52+resistor 53+resistor 54), $R_2$ (resistor 53+resistor 54), $R_3$ (resistor 54), Different values for compensation capacitance 16 are selected using switches (SW) 66 through 68. The compensation capacitance is utilized in order to maintain stability of the system. When the gain (controlled by the feedback resistance) is changed, this results in a change of frequency response that affects the stability of the system. For each gain select option, the corresponding compensation capacitance shifts the systems poles' positions, thus maintaining sufficient gain and phase margin for stable response. Values of capacitor 61, capacitor 62, capacitor 63 and capacitor 64 are selected so that system stability is maintained.

Table 1 below gives position of the switches for each of the possible selection bit combinations (00,01,10,11)

TABLE 1

| Bit Select | | SW 55 | SW 56 | SW 57 | SW 58 | SW 66 | SW 67 | SW 68 |
|---|---|---|---|---|---|---|---|---|
| 00 | $R_0$ | On | Off | Off | Off | On | On | On |
| 01 | $R_1$ | Off | On | Off | Off | On | On | Off |
| 10 | $R_2$ | Off | Off | On | Off | On | Off | Off |
| 11 | $R_3$ | Off | Off | Off | On | Off | Off | Off |

Values selected for resistors 51 through 54 are based on the circuit characteristics and the desired accuracy ($\alpha$) of the sensing system. For example, an accuracy of 60% (i.e., $\alpha$=60%) means that any selected range from 0 to a selected maximum luminance is guaranteed to utilize at least 60% of the full voltage range (i.e., 0 volts to Vcc) provided the selected maximum is within a defined range. Likewise, an accuracy of 80% (i.e., $\alpha$=80%) means that any selected range from 0 to a selected maximum illuminance is guaranteed to utilize at least 80% of the full voltage range provided the selected maximum is within the defined range.

For example, for the case where maximum selected resistance ($R_0$) of 100 mega ohms (M$\Omega$) results in a maximum illuminance of 100.0 lux, Table 2 below sets out the required resistance ($R_0,R_1,R_2,R_3$) and resulting illuminance ($M_0,M_1,M_2,M_3$) for the case where accuracy ($\alpha$) equals 60%.

TABLE 2

| Bit Select | | Resistance | | Maximum Illuminance |
|---|---|---|---|---|
| 00 | $R_0$ | 100 | $M_0$ | 100 |
| 01 | $R_1$ | 60 | $M_1$ | 167 |
| 10 | $R_2$ | 36 | $M_2$ | 278 |
| 11 | $R_3$ | 21.6 | $M_3$ | 463 |

As can be deduced from Table 2, the following relationship holds:

$R_{n+1}=\alpha R_n$ $M_{n+1}=R_n/\alpha$

For exampled, for the case where maximum selected resistance ($R_0$) of 100 mega ohms (M$\Omega$) results in a maximum illuminance of 100.0 lux, Table 3 below sets out the required resistance ($R_0,R_1,R_2,R_3$) and resulting illuminance ($M_0,M_1,M_2,M_3$) for the case where accuracy ($\alpha$) equals 80%.

TABLE 3

| Bit Select | | Resistance | | Maximum Illuminance |
|---|---|---|---|---|
| 00 | $R_0$ | 100 | $M_0$ | 100 |
| 01 | $R_1$ | 80 | $M_1$ | 125 |
| 10 | $R_2$ | 64 | $M_2$ | 156 |
| 11 | $R_3$ | 51.2 | $M_3$ | 195 |

As can be seen from Table 3, the following relationship still holds:

$R_{n+1}=\alpha R_n$ $M_{n+1}=R_n/\alpha$

As can be seen from Table 3, for higher accuracy (increased $\alpha$), the illuminance range reduces and the resistance values are higher. In order to maintain the same illuminance range with increasing accuracy ($\alpha$), it is necessary to add selection bits.

Figure 3:
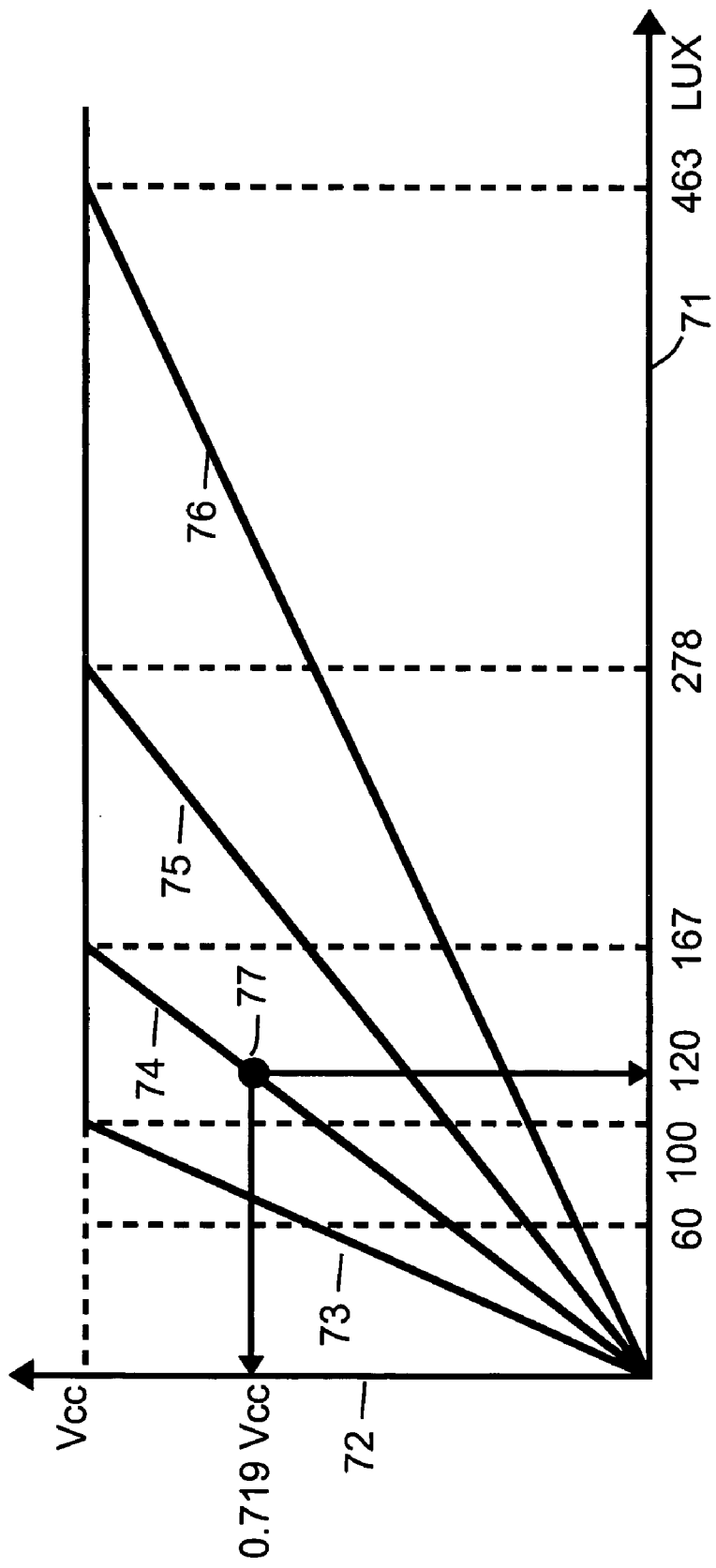
FIG. 3 is a graph that shows output swing verse illuminance in accordance with an embodiment of the present invention.

FIG. 3 is a graph that shows output swing verses illuminance for the case where maximum selected resistance ($R_0$) of 100 mega ohms (M$\Omega$) results in a maximum illuminance of 100.0 lux, and accuracy ($\alpha$) equals 60%.

An axis 71 represents illuminance (lux) detected by photo diode and filter 14 (shown in FIG. 1). An axis 72 represents the first output voltage placed on output 18 (shown in FIG. 1).

Trace 73 represents the response when selection switches 55 through 58 (shown in FIG. 2) select $R_0$ (resistor 51+resistor 52+resistor 53+resistor 54). Trace 74 represents the response when selection switches 55 through 58 (shown in FIG. 2) select $R_1$ (resistor 52+resistor 53+resistor 54). Trace 75 represents the response when selection switches 55 through 58 (shown in FIG. 2) select $R_2$ (resistor 53+resistor 54). Trace 76 represents the response when selection switches 55 through 58 (shown in FIG. 2) select $R_3$ (resistor 54).

As can be seen from FIG. 3, for a selected maximum illuminance within the defined range of 60 lux to 463 lux, any selected range from 0 to the selected maximum illuminance is guaranteed to utilize at least 60% of the full voltage range. All that is necessary is to utilize the selection bits to select the correct resistance value.

For example, suppose the selected maximum illuminance is 120 lux. For this case, the selected resistance would be $R_1$ and the resulting response is represented by trace 74. As can be seen from a labeled point 77 on the graph shown in FIG. 3, the selected range from 0 to a 215 lux utilizes 71.9% of the full voltage range.

Figure 4:
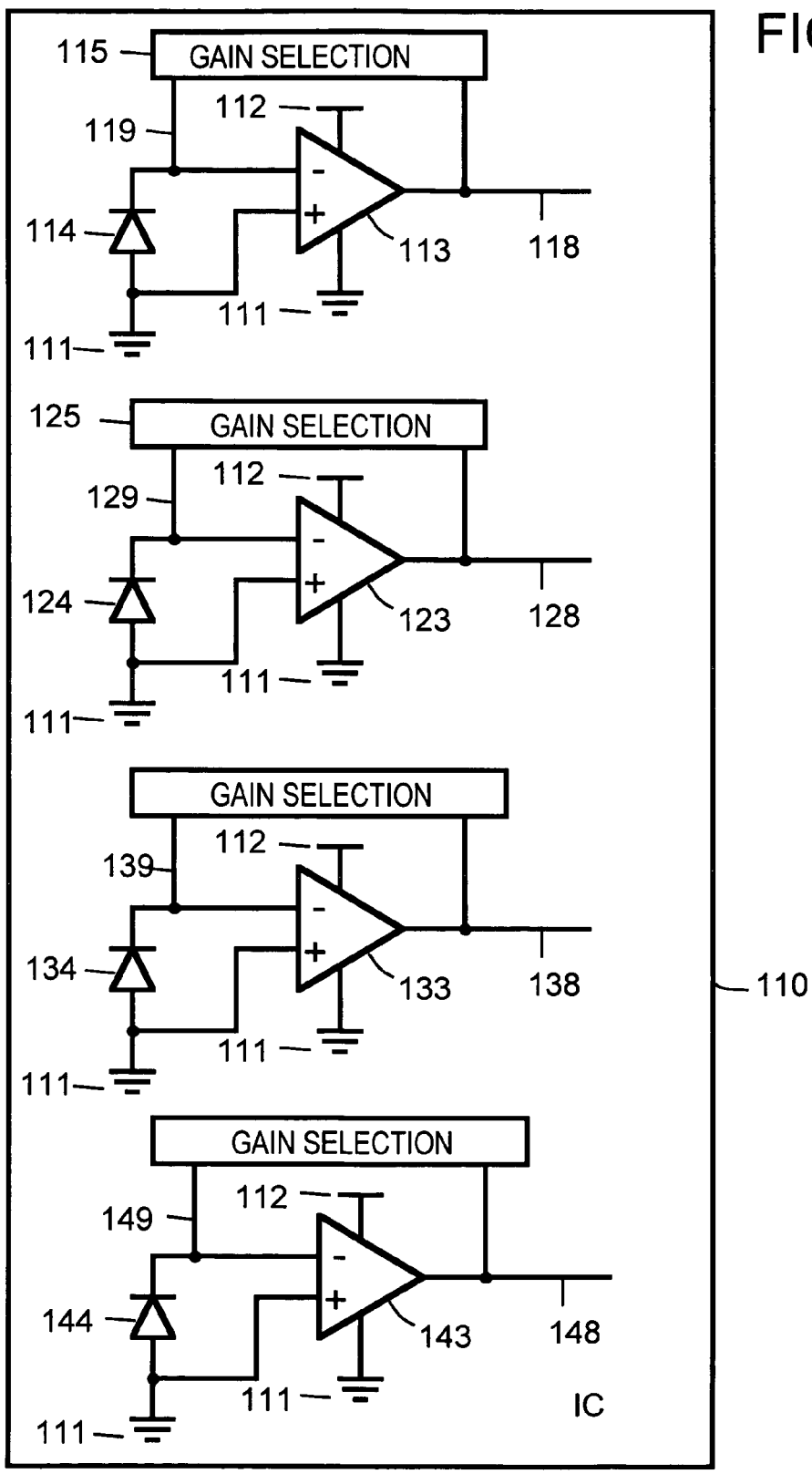
FIG. 4 is a simplified block diagram of a color sensor circuit in accordance with another embodiment of the present invention.

In accordance with various embodiments, the number of channels can vary based on the application. For example, FIG. 4 shows a color sensor circuit implemented on a single integrated circuit (IC) chip 110. A first color circuit generates a first output voltage placed on an output 118. The first output voltage indicates detected illuminance of a first color. For example, the first color is red. A photo diode and filter 114 detect illuminance of the first color. Photo diode and filter 114 is connected between a ground signal 111 and a line 119. An operational amplifier 113 amplifies voltage on line 119 to produce the first output voltage placed on output 118. Gain is controlled by a gain selection circuit 115. Operational amplifier 113 is connected to ground signal 111 and a Vcc signal 112, as shown.

A second color circuit generates a second output voltage placed on an output 128. The second output voltage indicates detected illuminance of a second color. For example, the second color is green. A photo diode and filter 124 detect illuminance of the second color. Photo diode and filter 124 is connected between ground signal 111 and a line 129. An operational amplifier 123 amplifies voltage on line 129 to produce the second output voltage placed on output 128. Gain is controlled by a gain selection circuit 125. Operational amplifier 123 is connected to ground signal 111 and Vcc signal 112, as shown.

A third color circuit generates a third output voltage placed on an output 138. The third output voltage indicates detected illuminance of a third color. For example, the third color is blue. A photo diode and filter 134 detect illuminance of the third color. Photo diode and filter 134 is connected between ground signal 111 and a line 139. An operational amplifier 133 amplifies voltage on line 139 to produce the third output voltage placed on output 138. Gain is controlled by a gain selection circuit 135. Operational amplifier 133 is connected to ground signal 111 and Vcc signal 112, as shown.

A fourth color circuit generates a fourth output voltage placed on an output 148. The fourth output voltage indicates detected illuminance of a fourth color. For example, the fourth color is white. A photo diode and filter 144 detect illuminance of the third fourth. Photo diode and filter 144 is connected between ground signal 111 and a line 149. An operational amplifier 143 amplifies voltage on line 149 to produce the fourth output voltage placed on output 148. Gain is controlled by a gain selection circuit 145. Operational amplifier 143 is connected to ground signal 111 and Vcc signal 112, as shown.

For example, for a six channel system, six color circuits are included that detect illuminance for six colors. For example, the six colors are red, blue, green, cyan, magenta and yellow. Alternatively, other colors can be used.

While FIG. 1 and FIG. 4 show embodiments with single stage amplifiers, as will be understood by persons of ordinary skill in the art, multiple stage amplifiers can also be used. Gain selection can be controlled for one or multiple stages of the amplifiers, depending upon the application.

Figure 5:
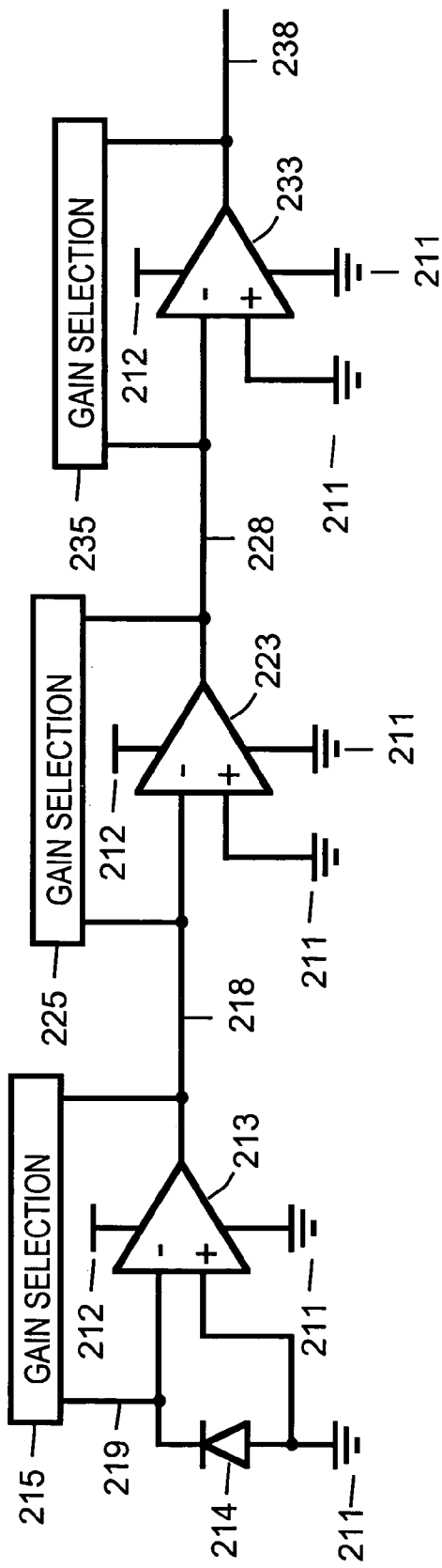
FIG. 5 is a simplified block diagram of a color sensor circuit in accordance with another embodiment of the present invention.

For example, FIG. 5 shows a multiple stage amplifier with gain selection for each stage. Specifically, a color circuit generates a circuit output voltage placed on a circuit output 238. A photo diode and filter 214 detect illuminance of the first color. Photo diode and filter 214 is connected between a ground signal 211 and a line 219. An operational amplifier 213 amplifies voltage on line 219 to produce an intermediate output voltage placed on output 218. Gain is controlled by a gain selection circuit 215. Operational amplifier 213 is connected to ground signal 211 and a Vcc signal 212, as shown.

An operational amplifier 223 amplifies voltage on line 218 to produce an intermediate voltage placed on output 228. Gain is controlled by a gain selection circuit 225. Operational amplifier 223 is connected to ground signal 211 and a Vcc signal 212, as shown. An operational amplifier 233 amplifies voltage on line 228 to produce the circuit output voltage placed on a circuit output 238. Gain is controlled by a gain selection circuit 235. Operational amplifier 233 is connected to ground signal 211 and a Vcc signal 212, as shown.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A sensor circuit comprising:
   a photodiode for detecting light incident upon the photodiode;
   a power supply configured to provide a differential supply voltage; and
   an amplifier circuit coupled to the photodiode, the amplifier circuit comprising:
      an operational amplifier powered by the differential supply voltage;
      a serial chain of resistors; and
      a first set of switches operable to couple a feedback circuit to the operational amplifier by configuring the serial chain of resistors in one of
         a) a first resistor feedback combination having a resistance value $R_n$ that is determined based on the differential supply voltage and a desired detectable level of light, or
         b) a second resistor feedback combination having a resistance value $R_{n+1}$ that is equal to $\alpha R_n$ wherein $\alpha$ is a desired accuracy parameter of the color sensor, and wherein the resistance value $R_{n+1}$ is lower than the resistance value $R_n$.

2. The sensor circuit of claim 1, wherein the desired accuracy parameter $\alpha$ is defined as a percentage value of the differential supply voltage corresponding to a maximum guaranteed output voltage swing from the amplifier circuit in response to a desired maximum level of light incident upon the photodiode.

3. The sensor circuit of claim 2, wherein the percentage value is less than 100% of the differential supply voltage whereby the desired accuracy parameter $\alpha$ has a value less than 1.

4. The sensor circuit of claim 1, wherein the second resistor feedback combination is generated by omitting a resistor from the first resistor feedback combination, the omitting being carried out by operating at least one switch in the first set of switches.

5. The sensor circuit of claim 4, wherein a detectable level of light $M_{n+1}$ is higher upon coupling the second resistor feedback combination into the operational amplifier in comparison to coupling the first resistor feedback combination into the operational amplifier.

6. The sensor circuit of claim 5, wherein the detectable level of light $M_{n+1}$ is defined by the relationship $M_{n+1} = R_n/\alpha$.

7. The sensor circuit of claim 1, wherein the amplifier circuit further comprises:
   a first capacitor that is included in the feedback circuit for providing a first frequency compensation to the amplifier circuit;
   a second capacitor having a capacitance value that is selected for providing in conjunction with the first capacitor, a second frequency compensation to the amplifier circuit;
   a third capacitor having a capacitance value that is selected for providing in conjunction with the first capacitor, a third frequency compensation to the amplifier circuit and for providing in conjunction with the first and second capacitors, a fourth frequency compensation to the amplifier circuit; and
   a second set of switches operable to couple at least one of the second or third capacitors in parallel with the first capacitor in the feedback circuit.

8. The sensor circuit of claim 7, wherein at least one of the first set or the second set of switches is controlled by a combination of digital control bits.

9. The sensor circuit of claim 1, wherein the differential supply voltage comprises Ground and Vcc.

10. A method of operating the sensor circuit of claim 1, the method comprising:
providing a graph of detectable levels of light versus output voltage swing from the amplifier circuit for various resistance values;
using the desired detectable level of light and a desired output voltage swing, for identifying a resistance value from the graph; and
operating the first set of switches for configuring the serial chain of resistors to provide a resistor feedback combination having the resistance value identified from the graph.

11. The method of claim 10, further comprising:
defining a range of detectable levels of light;
selecting a desired resistance value from the graph; and
using the desired resistance value and the defined range of detectable levels of light to identify from the graph, a range of output voltage swing.

12. A sensor circuit comprising:
a photodiode for detecting light incident upon the photodiode;
a power supply configured to provide a differential supply voltage; and
an amplifier circuit coupled to the photodiode, the amplifier circuit comprising:
an operational amplifier powered by the differential supply voltage;
a first series resistor combination having a resistance value $R_n$; and
a second series resistor combination having a resistance value $R_{n+1}$ that is lower than the resistance value $R_n$;
a first set of switches operable to generate the second series resistor combination by decoupling at least one resistor from the first series resistor combination, and further operable to couple the second series resistor combination to the operational amplifier as part of a feedback circuit;
a first capacitor that is included in the feedback circuit for providing a first frequency compensation to the amplifier circuit;
a second capacitor having a capacitance value that is selected for providing in conjunction with the first capacitor, a second frequency compensation to the amplifier circuit;
a third capacitor having a capacitance value that is selected for providing in conjunction with the first capacitor, a third frequency compensation to the amplifier circuit and for providing in conjunction with the first and second capacitors, a fourth frequency compensation to the amplifier circuit; and
a second set of switches operable to couple at least one of the second or third capacitors in parallel with the first capacitor in the feedback circuit.

13. The sensor circuit of claim 12, wherein a level of light $M_{n+1}$ detected by the sensor circuit is higher upon coupling the second resistor combination into the operational amplifier in comparison to coupling the first resistor combination into the operational amplifier.

14. The sensor circuit of claim 13, wherein the detectable level of light $M_{n+1}$ is defined by the relationship $M_{n+1}=R_n/\alpha$, wherein $\alpha$ is an accuracy parameter defined as a percentage value of the differential supply voltage corresponding to a maximum guaranteed output voltage swing from the amplifier circuit in response to a desired maximum level of light incident upon the photodiode.

15. The sensor circuit of claim 14, wherein the percentage value is less than 100% of the differential supply voltage whereby the desired accuracy parameter $\alpha$ has a value less than 1.

16. The sensor circuit of claim 12, wherein a combination of digital control bits is used for controlling the first set and the second set of switches, thereby providing a selectable plurality of combinations of resistors and capacitors in the feedback circuit.

* * * * *